[72] Inventors Donald Hirsch
Matawan;
Howard Clarence Meadors, Jr., Wayside,
both of N.J.

[21] Appl. No. 37,508
[22] Filed May 15, 1970
[45] Patented Nov. 2, 1971
[73] Assignee Bell Telephone Laboratories, Incorporated
Murray Hill, N.J.

[54] TIMING RECOVERY SYSTEM IN WHICH AN EQUALIZER'S SAMPLING TIME IS SET IN RESPONSE TO THE DIFFERENCE BETWEEN THE ACTUAL MEAN SQUARE ERROR AND A PREDETERMINED ACCEPTABLE ERROR
7 Claims, 3 Drawing Figs.

[52] U.S. Cl. .......... 178/69 R, 325/42, 325/65, 333/18
[51] Int. Cl. .......... H04b 1/10
[50] Field of Search .......... 325/42, 65; 333/18; 178/69

[56] References Cited

UNITED STATES PATENTS

| | | | |
|---|---|---|---|
| 3,537,038 | 10/1970 | Rich .......... | 333/18 |
| 3,544,716 | 12/1970 | Franaszek .......... | 178/69 |

*Primary Examiner—*
*Assistant Examiner—*Kenneth W. Weinstein
*Attorneys—*R. J. Guenther and Kenneth B. Hamlin

ABSTRACT: A system is disclosed in which an error signal used for adjusting tap weights in a time domain equalizer is integrated in an up-down counter over one-half of an interval. At the end of the first one-half of the interval, the count in the counter is decreased by a predetermined amount proportional to a minimum acceptable error level. The count in the counter is then reduced at a predetermined rate until the count in the counter is zero. During the time the count is being reduced at the predetermined rate, the sampling time of a signal applied to the equalizer is phase shifted in a direction determined by the difference between the integrated error in the present and preceding intervals.

INVENTORS D. HIRSCH
H.C. MEADORS, JR.
BY J.P. Kearns
ATTORNEY

TIMING RECOVERY SYSTEM IN WHICH AN EQUALIZER'S SAMPLING TIME IS SET IN RESPONSE TO THE DIFFERENCE BETWEEN THE ACTUAL MEAN SQUARE ERROR AND A PREDETERMINED ACCEPTABLE ERROR

FIELD OF THE INVENTION

This invention relates to a sampling phase adjusting system for a time domain equalizer and particularly to a sampling phase adjusting system for a time domain equalizer in which the sampling time for the equalizer is set in response to the difference between the average value of the actual equalizer error signal used for tap setting and a predetermined acceptable error level.

BACKGROUND OF THE INVENTION

Time domain equalizer systems are employed to operate on received signals which have been transmitted through dispersive transmission media. The received signal is periodically sampled and applied to the equalizer at a rate related to the information content in the received signal. The time domain equalizer can improve the quality of the received signal even if the phase at which it samples the received signal is arbitrary. The degree to which the received signal can be improved, however, is a function of the phase relationship between the received signal and the equalizer sampling time.

In some systems for adjusting the sampling phase at a signal receiver, a parameter indicative of signal quality is employed as an error signal in a feedback system to adjust the sampling phase relative to the received signal. These systems are normally configured to change the sampling phase until the measured parameter is driven to zero. If the parameter being measured is not susceptible of reaching zero, for example, an error rate or an error adjusting signal in another feedback loop, the feedback system continually operates, oscillating the timing phase around a minimum.

One system has been designed in an attempt to resolve this problem in which the derivative of the parameter was driven to zero rather than the parameter itself. The system works but requires substantial equipment. A further drawback to the derivative system is inherent because the sampling phase must be continually changing so that a derivative signal can be generated.

Another problem encountered in digital sampling phase adjusting systems is common to many digital feedback systems. If the incremental phase change made in response to a change indication is too small, a long time will be taken in trying to properly set the system. If on the other hand, the increment is too large, the proper adjusting point can be repeatedly overshot, thereby causing the system to oscillate.

BRIEF DESCRIPTION OF THE INVENTION

In accordance with this invention, a predetermined quantity is subtracted from the average value of an equalizer error signal normally used for tap setting purposes to provide a control signal. The sampling phase of the equalizer relative to a received signal is then adjusted until the control signal is driven to zero. In this way, the system will not oscillate while trying to set the timing phase to an unachievable condition, provided only that the predetermined quantity represents an equalizer error signal which is within the capability of the equalizer to achieve in cooperation with the sampling phase adjustment.

DETAILED DESCRIPTION

Figure 1:
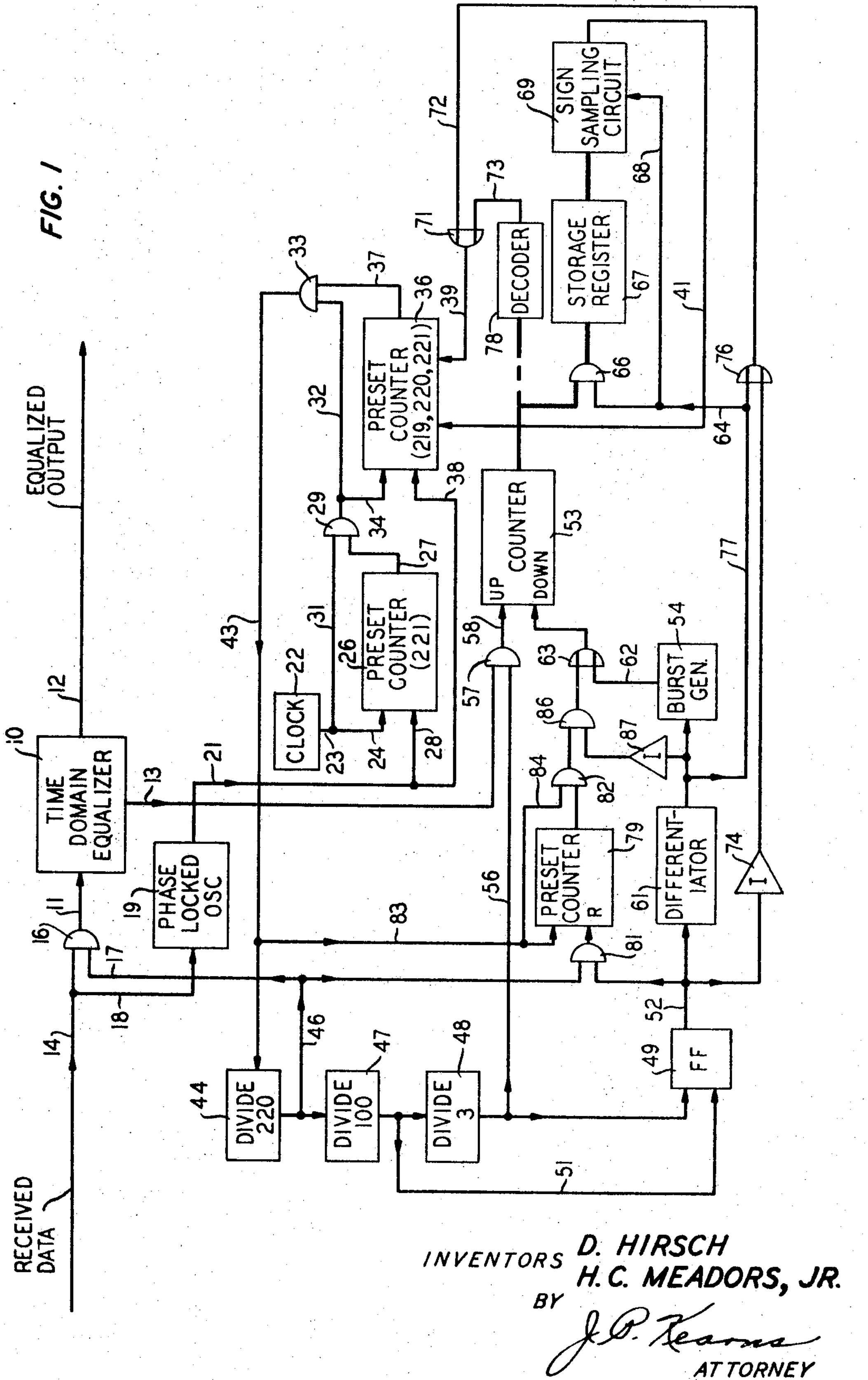
FIG. 1 shows in block diagram form a system constructed in accordance with the teachings of this invention.

A time domain equalizer 10, shown in FIG. 1, is designed to operate on a distorted data signal, samples of which are applied to a lead 11 at a data sampling rate to provide an equalized output signal on a lead 12. The equalizer 10 is assumed to be an adaptive equalizer which extracts error information from the sampled data signal. Such error information, which is made available on a lead 13, is internally correlated with the sampled data signal over a time interval to adjust multiplication factors in the equalizer. These factions are well known to the art and are disclosed in countless patents and articles.

An adaptive time domain equalizer, such as equalizer 10, can lower the rate of errors in decoding a received data signal if the errors are caused by delay distortion. This is so even if the samples of the distorted data signal are taken at a phase arbitrary with respect to the distorted data signal. The error rate of the equalized output signal appearing on lead 12 is, however, a function of the phase relationship between the sampling time of the distorted data signal and the distorted data signal itself.

Therefore, a data signal corrupted by delay distortion and received on a lead 14 is passed through a sampling gate 16. The sampling gate 16 is enabled by a sampling pulse on a lead 17 in order to provide the samples of the distorted data signal on the lead 11.

The received data signal on the lead 14 is also applied by a lead 18 to a phase-locked oscillator 19 which provides a train of pulses on a lead 21 having a repetition rate related in frequency and phase to the received data signal.

A clock 22 provides a pulse train on a lead 23 having a repetition rate approximately 230 times the repetition rate of the signal on the lead 21. Typically, the frequency of the signal upon the lead 21 is determined by a crystal oscillator at a transmitter, not shown, and the clock 22 is also advantageously a crystal oscillator so that the ratio between transmitter and receiver clock frequencies can be set fairly closely without the need of a phase-locked arrangement.

The signal on the lead 23 is applied by a lead 24 to a preset counter 26 which provides on a lead 27 a first signal level until 221 pulses have been counted and a second signal level until reset. The lead 21 applies the signal from the phase-locked oscillator 19 to a reset input terminal 28 of the preset counter 26 so that the signal on the lead 27 will stay at its first level for a time interval following a pulse on the lead 21 equivalent to 221 pulses from the clock 22 and will switch to, and remain at, its second level until the occurrence of the next pulse from the phase-locked oscillator 19.

The lead 27 applies the signal from the preset counter 26 as a first input to an AND-gate 29. The clock signal provided by clock 22 is applied by leads 23 and 31 as a second input to the AND-gate 29. In this way, exactly 221 pulses are passed by the AND-gate 29 during each interval between pulses from the phase-locked oscillator 19.

The pulses passed by the gate 29 are applied by a lead 32 to an AND-gate 33 and by a lead 34 to a variable count preset counter 36. The preset counter 36 will provide a first signal level on a lead 37 to the gate 33 until a preset count is achieved and a second signal level thereafter until reset by the signal from the phase-locked oscillator 19 applied by leads 21 and 38. The variable preset counter 36 will count 220 pulses when a first signal is applied to a lead 39 and either 219 or 221 in accordance with the sense of a signal applied to lead 41 when the signal on the lead 39 is at a second level.

Therefore, it is seen that the gate 33 will provide either 219, 220, or 221 pulses for each cycle of the phase-locked oscillator 19 on lead 43. The lead 43 provides an input to a divide-by-220 circuit 44. The output of the divide-by-220 circuit 44 furnishes by way of leads 46 and 17 the sampling input to the gate 16.

If the variable preset counter 36 always enables the gate 33 to pass 220 pulses, the phase relationship between the pulses provided respectively by the divide-by-220 circuit 44 and the phase-locked oscillator circuit 19 will remain constant. If, on the other hand, the variable preset counter circuit 36 enables the gate 33 to pass either 219 or 221 pulses, the phase relationship between the sampled pulse applied by leads 46 and 17 to the gate 16 will either be advanced or retarded in phase with respect to the received data signal on lead 14.

The output signal from the divide-by-220 circuit 44 is further divided by a divide-by-100 circuit 47 and a divide-by-3 circuit 48 in cascade. The divide-by-100 circuit 47 provides a pulse once for every 100 sampling pulses from the divide-by-220 circuit 44, as shown on line (*a*) of FIG. 2. The divide-by-3 circuit 48 is implemented to provide a square wave output on a lead 56, as indicated on line (*b*) of FIG. 2. A flip-flop 49 is caused to be set on each negative transition of the square wave signal from circuit 48. The signal from the divide-by-100 circuit 47 provided on the lead 51 causes the flip-flop 49 to be reset. The flip-flop 49 thus generates a signal on a lead 52 as shown on line (*c*) of FIG. 2.

Figure 2:
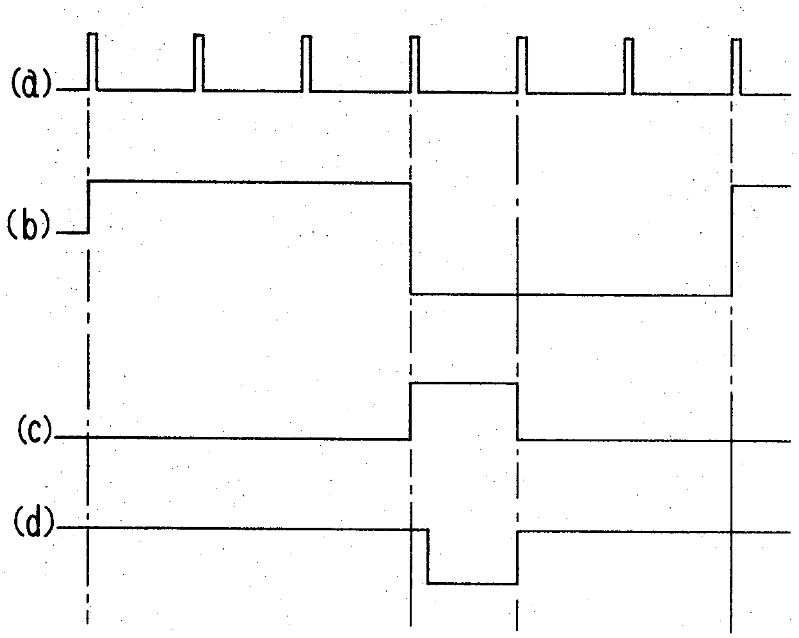
FIG. 2 is a timing diagram showing some timing signals which appear in the system of FIG. 1.

The waveforms shown in FIG. 2 set forth the overall timing for the system of this invention. During the positive one-half cycle of the waveform on line (*b*), which is seen to persist for the duration of 300 sampling pulses from the divide-by-220 circuit 44, the error signal from the time domain equalizer 10 on the lead 13 is integrated in a counter 53. During the time of the positive signal shown on line (*c*) of FIG. 2, a minimum acceptable error level is subtracted from the up-down counter 53 in accordance with a pulse train generated by a burst generator 54. The variable count preset counter 36 is then activated for a time interval determined by the remaining counts in the counter 53. For the remaining 200 counts while the signal on the line 56 is negative the sampling phase is held constant and the time domain equalizer 10 continues to adjust its taps adaptively.

To accomplish this, the output from the divide-by-3 circuit 48 is applied by a lead 56 to an AND-gate 57. The error signal on the lead 13 is applied as a second input to the gate 57. The output of gate 57 is applied by a lead 58 as an input to an up-count input terminal of the counter 53. The error output on the lead 13 from the time domain equalizer in this case is a digital signal represented by a pulse train. It should be understood that an analog error signal could be provided by a time domain equalizer in which case the up-down counter 53 would be replaced with an analog integrating circuit.

At the end of 300 sampling pulses provided by the divide-by-220 circuit 44, the divide-by-3 circuit 48 provides a negative signal to the lead 56 in order to inhibit the gate 57 from passing further error information to the up-down counter 53. At the same time the signal from the flip-flop 49 is applied by lead 52 to a differentiator 61 to provide a pulse of predetermined duration at the leading edge of the waveform shown on line (*c*) of FIG. 2. This pulse is applied to the burst generator 54 which provides a predetermined number of pulses representing a minimum acceptable error level for the time domain equalizer 10 on a lead 62 to an OR-gate 63. These burst pulses are passed by the OR-gate 63 to a down-count input terminal of the counter 53 to remove the predetermined count from the number stored in the counter 53.

The differentiator pulse on lead 77 is also applied by a lead 64 to an AND-gate 66 which transfers the integrated error stored in the counter 53 at the end of its counting interval to a storage register 67 and by a lead 68 to a sign sampling circuit 69.

The sign sampling circuit 69 provides a signal to the lead 41 which is indicative of the algebraic sign of the difference between predetermined threshold error pulse generated in differentiator 61 and the signal stored in register 67. The duration of the threshold error pulse may also advantageously compensate for the inherent delays in transferring signal from the input to the output of counters and storage registers, such as counter 53 and storage register 67. The sense signal at the output of the sign sampling circuit 69 is held until the lead 68 is reactivated. This output on the lead 41 determines the direction in which the preset counter 36 will phase shift the timing phase when the lead 39 is activated. The phase of the sampling pulse on lead 17 is permitted to the shift in only one direction during each gross interval of 600 sampling pulses.

The output of an OR-gate 71 on the lead 39 normally holds the preset counter 36 to a count of 220 when an input signal is applied thereto at either of leads 34 or 38. The present counter 36 will count either to 219 or 221 as determined by the signal from the sign sampling circuit 69 on lead 41 whenever the OR gate is inactivated.

The OR-gate 71 is driven by either a timing signal on a lead 72 or a phase-adjusting signal on a lead 73. The timing signal on the lead 72 drives the gate 71 to cause the preset counter 36 to count to 220 during the interval when the signal on line (*c*) of FIG. 2 is low and also during the predetermined threshold error period when the burst generator 54 is activated. The signal on the lead 72, as shown on line (*d*) of FIG. 2, results from the application of the output of the flip-flop 49 inverted in an inverter 74 to a first input terminal of an OR-gate 76 and the output of the differentiator 61 on a lead 77 to a second input terminal thereof.

The phase-adjusting input for the OR-gate 71 on the lead 73 is provided by a decoder 78 which senses the output of the up-down counter 53 during the interval that the flip-flop 49 provides the positive signal interval shown on line (*c*) of FIG. 2. The decoder 78 enables the preset counter 36 to count either 219 or 221 so long as the count in the counter 53 is not zero. A preset counter 79 provides down-counting pulses to the counter 53 to reduce the count therein at a predetermined rate until the contents thereof reach zero. In this manner the preset counter 36 is activated to phase shift the sampling phase for an interval proportional to the difference between the measured average error and a minimum acceptable error.

The pulses for down counting the counter 53 are taken from the AND-gate 33 by way of the lead 43 and are further applied by leads 83 and 84 to an AND-gate 82. The AND-gate 82 passes a predetermined number of pulses on the lead 84 as determined by the preset counter 79. The pulses from AND-gate 82 are applied to the AND-gate 86 and then to the OR-gate 63. The output of the OR-gate 63 drives the down-counting input terminal of the counter 53. The only time that the AND-gate 86 does not pass pulses applied to it is during the interval when the burst generator 54 is down counting the counter 53. To inhibit the AND-gate 86 during the burst interval, the output from the differentiator 61 is inverted by an inverter 87 and applied as a second input to the AND-gate 86.

The preset counter 79 determines the number of pulses passed by the AND-gate 82 by enabling it for a predetermined number of counts of the signal on the lead 43. After the predetermined number of counts the preset counter 79 changes states and remains in the new state until reset. A reset pulse is applied to the preset counter 79 at the beginning of each sampling interval when the flip-flop 49 is in its high state as shown on line (*c*) of FIG. 2. The reset pulses arise from a coincidence of an output from the flip-flop 49 with the sampling pulses from the divide-by-220 circuit 44 at an AND-gate 81. When the AND-gate 81 no longer passes pulses to reset the preset counter 79, the preset counter 79 disables its AND-gate 82 from passing any more down-counting pulses.

Figure 3:
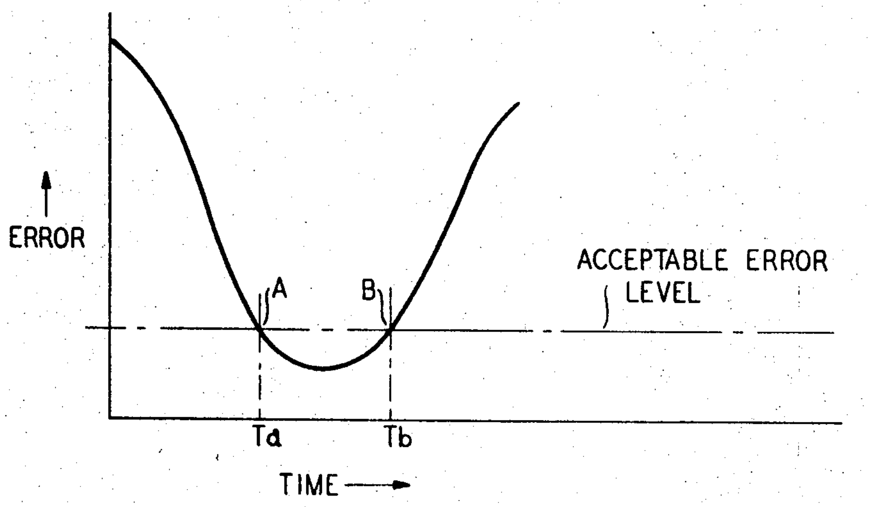
FIG. 3 is a graph showing tap error versus sampling time in a time domain equalizer.

It will be recalled that the direction in which the sampling phase is adjusted is determined by the sign sampling circuit 69. If the present error is greater than the predetermined threshold error, the timing phase will be adjusted in a first direction. If the present error is less than the threshold error, the timing phase will be adjusted in an opposite direction. By looking at FIG. 3 one can see that if the sampling phase is in the vicinity of the time $T_a$, this algorithm will converge at an acceptable error level, while if the sampling phase is in the vicinity of the time $T_B$, the system illustrated in FIG. 1 can drive the timing phase either forward or backward in time to a point such as A at time $T_a$. This phenomenon results from the fact that in our system we are choosing the direction of phase shifting in accordance with the difference in error rather than with the rate of change of the error.

It has been found, however, that such an arrangement is quite practical and there is no need for measuring the slope of the error curve unless an attempt is being made to actually minimize the error. In accordance with this invention by accepting a predetermined error level there is no need to measure the slope of the error curve.

It should be understood that various other embodiments and modifications can be made by those skilled in the art without departing from the spirit and scope of the invention.

What is claimed is:

1. In combination:

a time domain equalizer for equalizing a sampled data signal having a predetermined sampling rate to provide an equalized data signal and an error signal indicative of the difference between said equalized data signal and an ideal data signal;

means responsive to a received data signal, having a data rate related to said predetermined sampling rate, rendered effective by a sampling pulse for providing said sampled data signal;

means responsive to said error signal for providing an average error signal;

means for providing a predetermined minimum acceptable error reference signal means responsive to the difference between said average error signal and said predetermined minimum acceptable error reference signal reference signal for providing a control signal, and means responsive to said control signal for providing said sampling signal at a phase with respect to said received data signal as determined by said control signal.

2. The combination as defined in claim 1 in which said means responsive to said error signal is operative during a first interval; said means responsive to said control signal is operative during a second interval; and both of said immediately aforementioned means are inoperative during a third interval.

3. The combination as defined in claim 2 in which said first interval is longer than said second interval.

4. The combination as defined in claim 3 in which said second interval is short with respect to said third interval.

5. The combination as defined in claim 1 in which said means responsive to said error signal includes an up-down counter.

6. The combination as defined in claim 5 in which said means responsive to the difference between said average error and reference signals includes a storage register and an algebraic sign sampling circuit.

7. The combination as defined in claim 6 in which said means responsive to said control signal includes a variable count preset counter.

* * * * *